(12) United States Patent
Tyll

(10) Patent No.: US 9,023,121 B2
(45) Date of Patent: May 5, 2015

(54) SOLID FEED SYSTEMS FOR ELEVATED PRESSURE PROCESSES, GASIFICATION SYSTEMS AND RELATED METHODS

(75) Inventor: Jason S. Tyll, East Northport, NY (US)

(73) Assignee: Alliant Techsystems Inc., Arlington, VA (US)

( * ) Notice: Subject to any disclaimer, the term of this patent is extended or adjusted under 35 U.S.C. 154(b) by 1089 days.

(21) Appl. No.: 12/908,768

(22) Filed: Oct. 20, 2010

(65) Prior Publication Data
US 2012/0096769 A1   Apr. 26, 2012

(51) Int. Cl.
| | | |
|---|---|---|
| B01J 7/00 | (2006.01) | |
| C01B 3/36 | (2006.01) | |
| C10J 3/48 | (2006.01) | |
| C10J 3/50 | (2006.01) | |
| F23K 3/02 | (2006.01) | |
| F23G 5/44 | (2006.01) | |
| B05B 7/14 | (2006.01) | |

(52) U.S. Cl.
CPC ........ *C10J 3/485* (2013.01); *Y02E 20/18* (2013.01); *C10J 3/506* (2013.01); *C10J 2300/093* (2013.01); *C10J 2300/1618* (2013.01); *C10J 2300/165* (2013.01); *C10J 2200/152* (2013.01); *C10J 2300/0959* (2013.01); *C10J 2300/0976* (2013.01); *C10J 2300/1892* (2013.01); *C10J 2200/158* (2013.01); *F23K 3/02* (2013.01); *F23G 5/444* (2013.01); *F23G 2201/40* (2013.01); *F23G 2209/26* (2013.01); *B05B 7/144* (2013.01); *B05B 7/1486* (2013.01)

(58) Field of Classification Search
CPC ............... C10J 2200/152; C10J 2300/0976; C10J 2300/1892
See application file for complete search history.

(56) References Cited

U.S. PATENT DOCUMENTS 3,246,683 A * 4/1966 Yap et al. ................... 159/47.1
3,251,550 A * 5/1966 Muschelknautz et al. ........ 239/4
(Continued)

FOREIGN PATENT DOCUMENTS

EP    1435484 A2    7/2004
GB    1026940 A     4/1966
(Continued)

OTHER PUBLICATIONS

Fox Solids Conveying Eductors, http://www.foxvalve.com/conveying_eductors/index.html, retrieved Oct. 14, 2010, 2 pages, Fox Venturi Eductors/Fox Valve.
(Continued)

*Primary Examiner* — Imran Akram
(74) *Attorney, Agent, or Firm* — TraskBritt

(57) ABSTRACT

A solid feed system may comprise a supersonic nozzle, an isolated injection section having a port for injection of solid feedstock positioned downstream from the supersonic nozzle, and a supersonic diffuser positioned downstream from the isolated injection section. Additionally, a gasification system may comprise such a solid feed system and a reaction chamber downstream thereof. Furthermore, a method of reacting a solid feedstock under pressure may include directing a fluid flow through a supersonic nozzle to provide a supersonic flow stream, and directing the supersonic flow stream through an isolated injection section at a static pressure at least fifty percent (50%) lower than an operating pressure within a reaction chamber (e.g., at a static pressure near ambient pressure).

24 Claims, 7 Drawing Sheets

(56) References Cited

U.S. PATENT DOCUMENTS

| | | | |
|---|---|---|---|
| 4,019,783 A * | 4/1977 | Kayser | 406/144 |
| 4,278,446 A | 7/1981 | Von Rosenberg, Jr. et al. | |
| 4,807,814 A * | 2/1989 | Douche et al. | 239/428 |
| 5,515,794 A * | 5/1996 | Kassman et al. | 110/261 |
| 6,350,394 B1 * | 2/2002 | Ennis et al. | 252/373 |
| 8,709,335 B1 * | 4/2014 | Vlcek et al. | 419/66 |
| 2005/0153069 A1 * | 7/2005 | Tapphorn et al. | 427/180 |
| 2005/0252430 A1 | 11/2005 | Satchell | |
| 2007/0036905 A1 * | 2/2007 | Kramer | 427/421.1 |
| 2008/0250715 A1 * | 10/2008 | Cooper et al. | 48/197 FM |
| 2010/0136242 A1 * | 6/2010 | Kay et al. | 427/427 |
| 2010/0151124 A1 * | 6/2010 | Xue et al. | 427/185 |
| 2011/0052824 A1 * | 3/2011 | Venkatachalapathy et al. | 427/421.1 |
| 2011/0094158 A1 * | 4/2011 | Schubert | 48/85 |
| 2011/0104369 A1 * | 5/2011 | Kim et al. | 427/180 |

FOREIGN PATENT DOCUMENTS

| | | |
|---|---|---|
| WO | 0185873 A2 | 11/2001 |
| WO | 2009081282 A2 | 7/2009 |

OTHER PUBLICATIONS

International Preliminary Report on Patentability for International Application No. PCT/US2011/055830 dated Apr. 23, 2013, 6 pages.

International Search Report for International Application No. PCT/US2011/055830 dated Jan. 31, 2012, 4 pages.

International Written Opinion for International Application No. PCT/US2011/055830 dated Jan. 31, 2012, 5 pages.

* cited by examiner

SOLID FEED SYSTEMS FOR ELEVATED PRESSURE PROCESSES, GASIFICATION SYSTEMS AND RELATED METHODS

TECHNICAL FIELD

Embodiments of the present disclosure relate to solid feed systems and, more specifically, to solid feed systems for elevated pressure processes, such as coal and biomass gasification plants.

BACKGROUND

Numerous elevated pressure processes utilize solid feedstock, or would benefit from use of a solid feedstock. For example, gasification processes, such as for coal and biomass, may utilize solid feedstock that is fed into a pressurized reaction chamber. For some processes, pressures in excess of 500 psia (e.g., up to 1000 psia) may be utilized, such as for compact gasifiers utilizing processes including an Integrated Gasification Combined Cycle (IGCC).

Initially, the solid feedstock is located in a substantially ambient pressure environment, outside of the system. The solid feedstock must then be moved from the substantially ambient pressure environment to an elevated pressure within the system. To address this pressure change, solid feedstock may conventionally be delivered to a pressurized system by one of a multi-stage lock hopper system, a slurry pumping system, a pneumatic feed system, and a Stamet pump.

Regarding multi-stage lock hopper systems, a low-pressure hopper chamber is first opened only to the outside environment and solids are inserted into the low-pressure hopper chamber at ambient pressure. A valve is then opened and the material in the low-pressure hopper chamber is transferred to a lock hopper chamber by a valve. An inert gas is pumped into the lock hopper chamber, pressurizing the lock hopper chamber. Then, the material in the lock hopper chamber is transferred to a high-pressure hopper before being transferred into the reaction chamber. The lock hopper chamber is then closed, and the lock hopper chamber is bled down to substantially ambient pressure to restart the cycle. As may be observed, this procedure requires compression of the lock hopper chamber, or the loss of reactor gases by back gassing into the lock hopper chamber upon opening. Furthermore, the pressurization of the lock hopper may be a major portion of the cycle time. In view of this, multi-stage lock hoppers suffer from high inert gas consumption, high-energy consumption for compression, and product (e.g., syngas) dilution with the inert gas. Multi-stage lock hopper systems also are only capable of delivering bulk product at intermittent intervals. Intermittent product delivery may be suitable for some gasifiers, such as those utilizing a batch process, but it is not suitable for all types of gasifiers, such as those that require a continuous feed.

Regarding slurry pumping systems for gasification systems, a solid feedstock is suspended in water (or other liquid) to form a pumpable slurry. The slurry is then pumped from the ambient pressure environment, and injected into a pressurized reaction chamber through a high-pressure injector as an atomized spray. Although pumping the slurry requires relatively low power consumption, the water required to create a pumpable slurry is substantially greater than that required in the gasification reaction (i.e., on the order of 65% greater). In view of this, extra energy is required to vaporize and superheat the excess water that does not contribute to the reaction and creation of product. This results in lower overall cycle performance. Additionally, the high velocity spray from the high-pressure injector may cause impact erosion within the reaction chamber.

Pneumatic feed systems, like multi-stage lock hoppers, suffer from high-energy consumption and inert gas consumption.

Finally, existing solid pumping systems, like the Stamet pump, have limited pressure rise and are also vulnerable to mechanical issues, such as erosion.

In view of the foregoing, an improved solid feed system for elevated pressure processes, such as coal and biomass gasification plants, would be desirable.

BRIEF SUMMARY

In some embodiments, a solid feed system may comprise a supersonic nozzle, an isolated injection section positioned downstream from the supersonic nozzle, and a supersonic diffuser positioned downstream from the isolated injection section. Additionally, the isolated injection section may have a port for injection of solid feedstock.

In additional embodiments, a gasification system may comprise a fluid inlet port, a solid feed system, and a reaction chamber downstream of the solid feed system. The solid feed system may comprise a supersonic nozzle, an isolated injection section positioned downstream from the supersonic nozzle, and a supersonic diffuser positioned downstream from the isolated injection section. Additionally, the isolated injection section may have a port for injection of solid feedstock.

In yet additional embodiments, a method of reacting a solid feedstock under pressure may include directing a fluid flow through a supersonic nozzle to provide a supersonic flow stream and directing the supersonic flow stream through an isolated injection section at a static pressure at least fifty percent (50%) lower than an operating pressure within a reaction chamber (as a non-limiting example, the static pressure may be near ambient pressure). The method may further include feeding a solid feedstock from an ambient pressure environment into the isolated injection section, converting fluid dynamic pressure of the supersonic flow stream to fluid static pressure with a supersonic diffuser to provide a pressurized fluid flow, and directing the pressurized fluid flow and solid feedstock into the reaction chamber.

DETAILED DESCRIPTION

Figure 1:
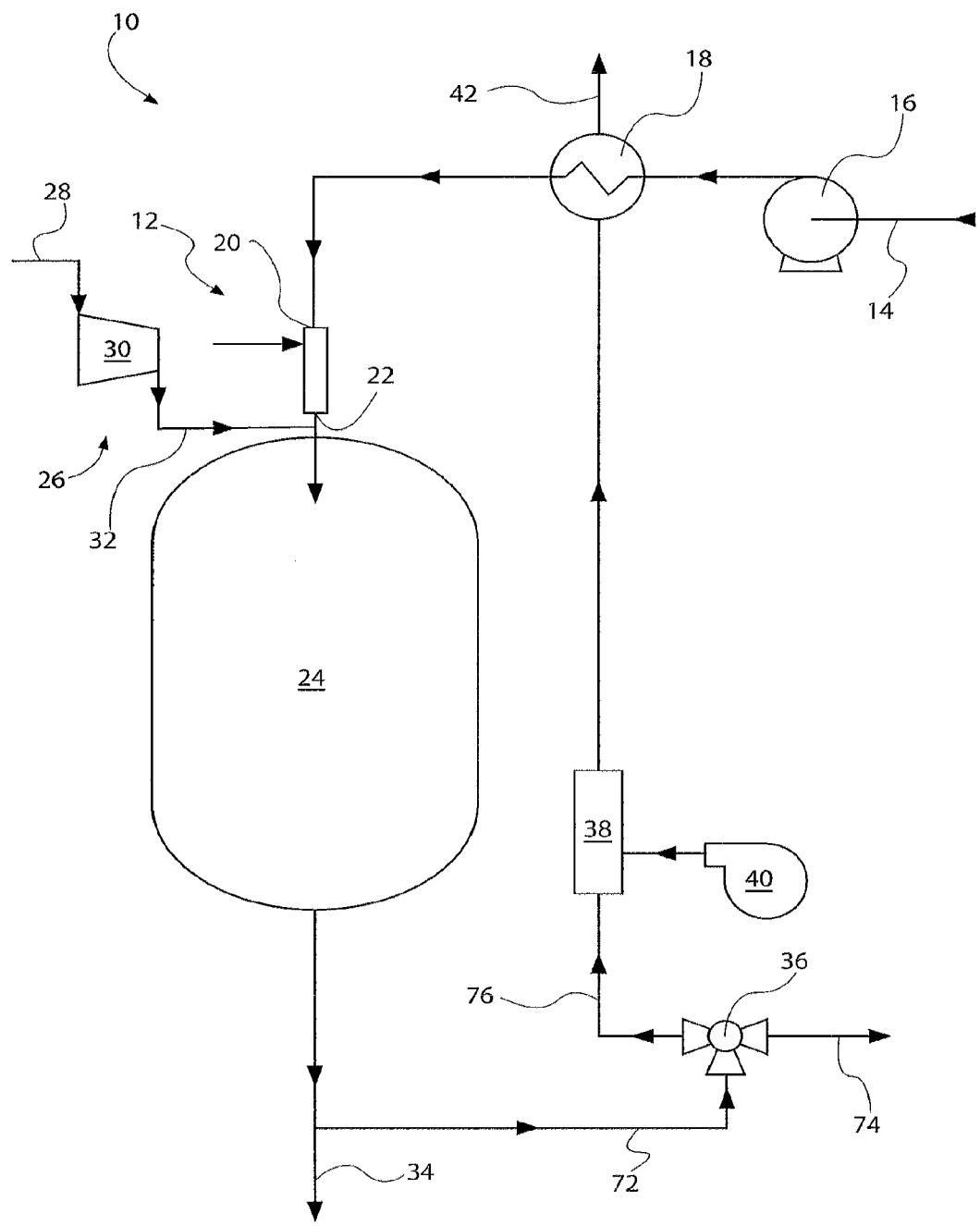
FIG. 1 is a schematic diagram of a gasification system including a solid feed system, according to an embodiment of the present invention.

Referring in general to the following description and accompanying drawings, various embodiments of the present invention are illustrated to show its structure and method of operation. Common elements of the illustrated embodiments may be designated with similar reference numerals. It should be understood that the figures presented are not meant to be illustrative of actual views of any particular portion of an actual structure or method, but are merely idealized representations employed to more clearly and fully depict the present invention as defined by the appended claims.

An example of a direct fire gasification system 10 including a solid feed system 12 is shown in FIG. 1. The gasification system 10 includes a water supply 14, a pump 16, and a heat exchanger 18 to provide steam to an inlet 20 of the solid feed system 12. The exit 22 of the solid feed system 12 is operably coupled to a reaction chamber 24, shown configured as an entrained flow gasifier, along with an oxygen injection system 26, which includes an oxygen supply 28, a compressor 30 and one or more injectors 32 (only one depicted for clarity). The gasification system 10 further includes a waste port 34, a three-way valve 36, a burner 38, an air blower 40 and an exhaust 42 for handling of the products exiting the burner 38, and a product line 74 for exit of a stream from the reaction chamber 24.

Water from the water supply 14 may be directed to an inlet of the pump 16 and pumped to a relatively high pressure as a liquid, which may require relatively little power consumption. The pressurized liquid water may then be directed out of the pump 16 and directed into the heat exchanger 18, where it may be heated and vaporized to form a pressurized, superheated steam. For example, the heat exchanger 18 may include an evaporator and a superheater. Water in the heat exchanger 18 may be evaporated to form steam in the evaporator of the heat exchanger 18 and the steam from the evaporator may be superheated in the superheater of the heat exchanger 18. Upon exiting the superheater of the heat exchanger 18, the superheated steam may have a pressure selected to achieve a desired operating pressure of the reaction chamber 24 of the gasification system 10 and a temperature sufficient to maintain the temperature of the steam above a saturation temperature within the solid feed system 12 to prevent condensation. The pressurized and superheated steam may then be directed into the inlet 20 of the solid feed system 12.

Figure 2A:
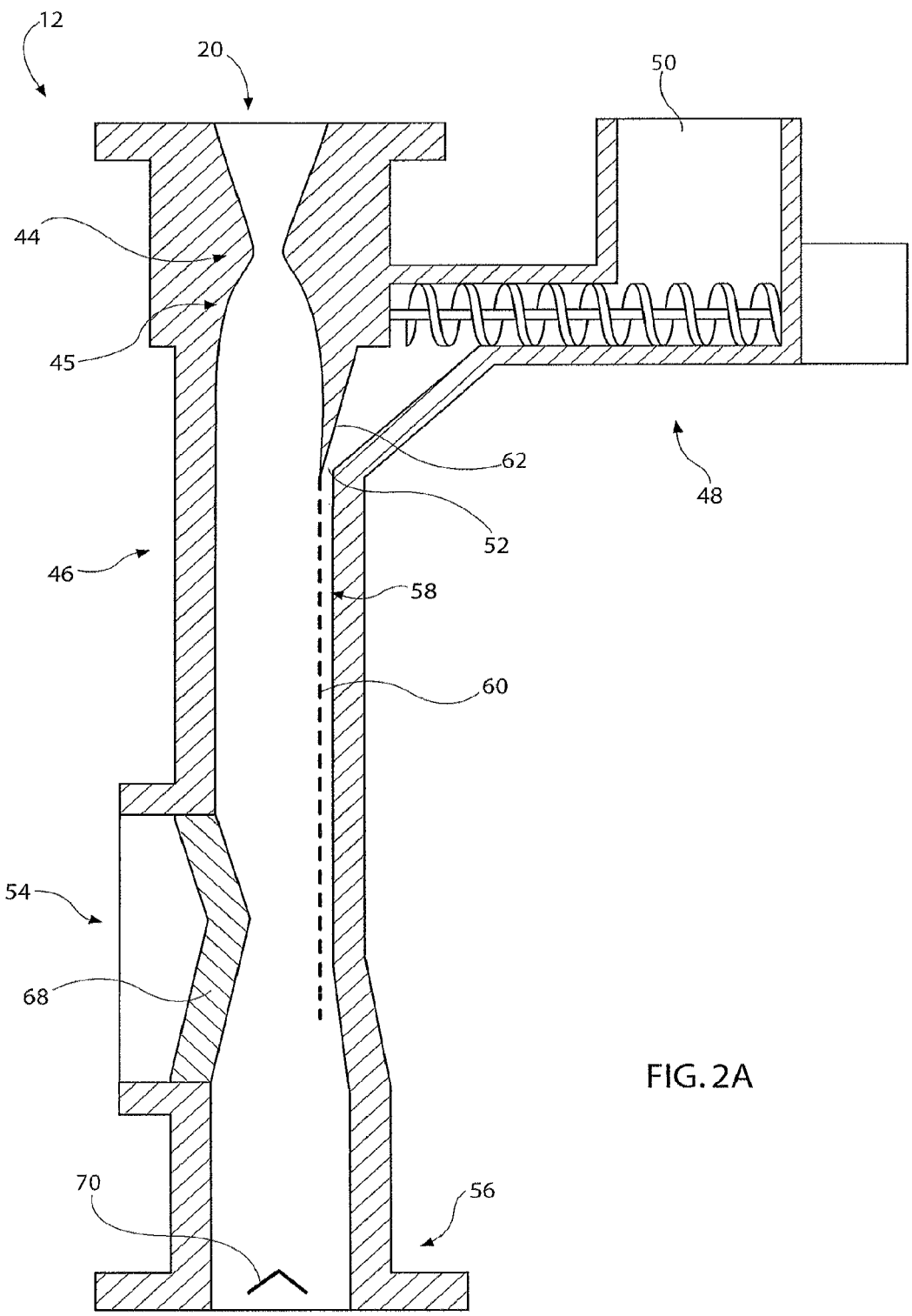
FIG. 2A is a longitudinal cross-sectional view of the solid feed system of FIG. 1, depicted with an ambient pressure hopper and a screw feed.

As shown in FIG. 2A, the solid feed system 12 may include the inlet 20 at a first end, a supersonic nozzle 44, and an isolated injection section 46 downstream from the supersonic nozzle 44. As used herein, the term "isolated" means that fluid conditions are controlled by the total pressure and temperature of the working fluid, and not significantly affected by downstream conditions (e.g., reactor pressure). A solid material feeder 48 may include an ambient hopper 50 (i.e., open to the ambient environment and local atmospheric pressure) and may be operably associated with an injection port 52 in the isolated injection section 46. A supersonic diffuser 54 may be positioned downstream from the isolated injection section 46 and followed by an injector 56. Finally, the injector 56 may be operably associated with an inlet of the reaction chamber 24 (FIG. 1).

In some embodiments, the supersonic nozzle 44 may be a converging-diverging supersonic nozzle, which may be used to create a supersonic flow of steam. The supersonic nozzle 44 may be selected in correlation to the superheated steam pressure and temperature to provide a supersonic flow of steam having a temperature of about 100 degrees Celsius (100° C.), or above, to avoid condensation. Additionally, the supersonic nozzle 44 may be selected in correlation to the superheated steam pressure and temperature to provide a supersonic flow of steam having a static pressure at or near ambient pressure (i.e., local atmospheric pressure). The supersonic nozzle 44 may further include a shape-change region 45, which may be located upstream from the throat, downstream from the throat, or some combination thereof, configured to implement a change in cross-sectional shape from generally round to generally rectangular (e.g., generally square).

From the supersonic nozzle 44, the supersonic flow of steam is directed through the isolated injection section 46. The isolated injection section 46 is a specific length of conduit having a cross-sectional area and shape selected to maintain the supersonic flow conditions of the steam therethrough. In addition to maintaining the steam at a supersonic velocity, the steam may be maintained within the isolated injection section 46 at a temperature of about 100° C., or above, and at a static pressure that is at or near ambient pressure (i.e., local atmospheric pressure). In some embodiments, the static pressure within the isolated injection section 46 may be within 100 percent (100%) of ambient pressure. In further embodiments, the static pressure within the isolated injection section 46 may be within 10 percent (10%) of ambient pressure. For example, if the local atmospheric pressure is 100 kPa, the static pressure within the isolated injection section 46 may be between 90 kPa and 110 kPa absolute pressure (i.e., between −10 kPa and 10 kPa gage pressure). Additionally, the static pressure within the isolated injection section section 46 may be less than about 50 percent (50%) of an operating pressure within the reaction chamber 24 (FIG. 1). In further embodiments, the static pressure within the isolated injection section 46 may be less than about 10 percent (10%) of an operating pressure within the reaction chamber 24.

As the steam flows through the isolated injection section 46, solid feedstock may be injected through the injection port 52 in a wall of the isolated injection section 46. As the injection port 52 is located within the isolated injection section 46, the static pressure at the injection port 52 may be at or near the local atmospheric pressure. In view of this, the solid feedstock may be moved from outside the isolated injection section 46 and into the isolated injection section 46 without a significant change in pressure. This may allow a conventional solid material feeder for ambient pressure applications to be used to feed the solid feedstock through the injection port 52 and into the isolated injection section 46. For example, the ambient hopper 50 may be loaded with solid feedstock (i.e., in particulate form), and the solid material feeder 48, such as a screw feed as shown in FIG. 2A, may be utilized to transport the feedstock from the hopper 50 to the injection port 52 and to meter the quantity of solid feedstock directed into the isolated injection section 46. Although a screw feed is shown, other solid material feeders also may be used, as will be understood by those of ordinary skill in the art.

Figure 6:
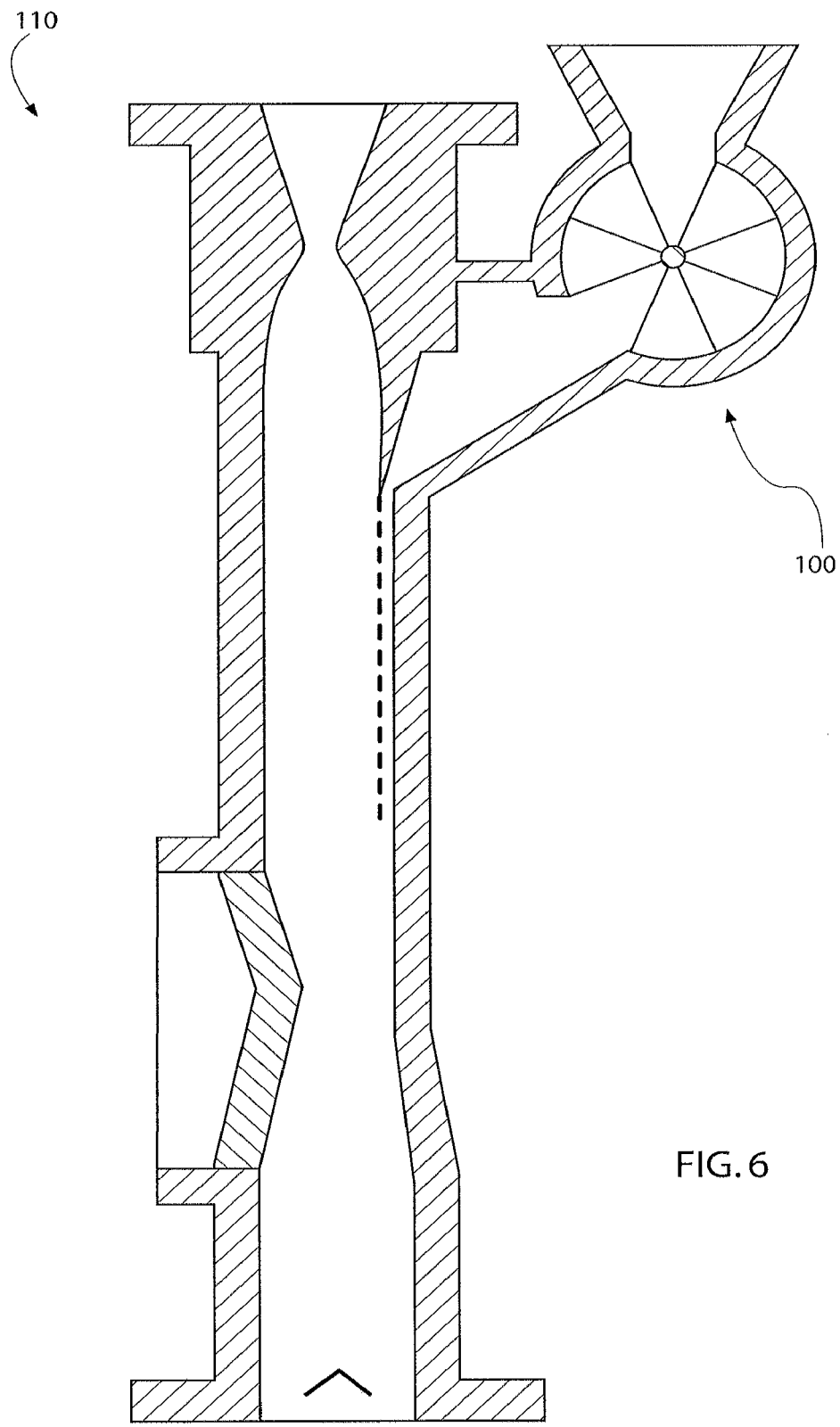
FIG. 6 is a longitudinal cross-sectional view of a solid feed system having a rotary airlock material feeder, according to another embodiment of the invention.

Examples of suitable solid material feeders include, but are not limited to, single-screw feeders (e.g., the material feeder 48 shown in FIGS. 2A and 3), such as the S500 and S60 series available from K-Tron International of Pitman, NJ, and rotary airlock valves (e.g., a rotary airlock valve 100 as shown included with the solid feed system 110 in FIG. 6), such as are available from Bush & Wilton Limited of Tiverton Devon, England.

The injection port 52 in the wall of the isolated injection section 46 may be configured to deliver solid feedstock therethrough in a direction substantially aligned (i.e., parallel) with the supersonic steam flow. Additionally, a relief region 58 may be located downstream of the injection port 52 to avoid disruption of the supersonic steam flow. The relief region 58 may be sized to accommodate the injected solid feedstock within the isolated injection section 46. The relief region 58 may be partially separated from the flow path of the supersonic steam by a permeable barrier 60, which may be aligned with an upstream portion 62 of the wall of the isolated injection section 46.

Figure 2B:
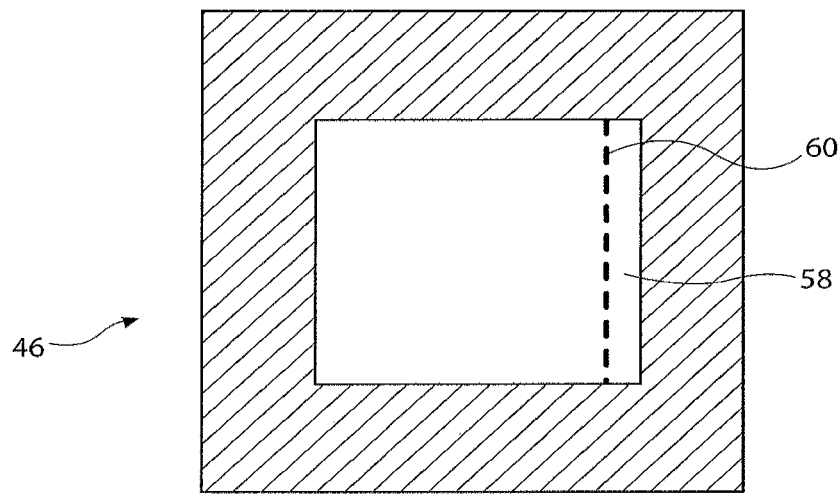
FIG. 2B is a lateral cross-sectional view of the solid feed system of FIG. 2A, depicting a relief area and a permeable barrier in an isolated injection section.
Figure 2C:
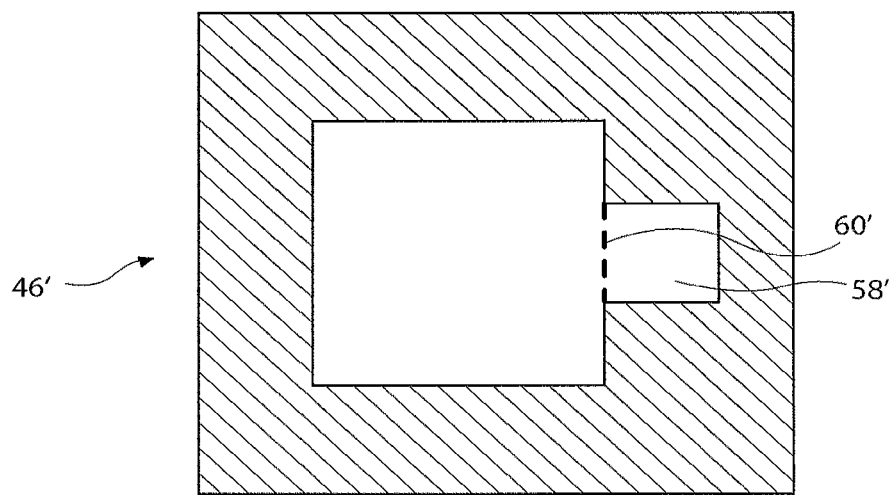
FIG. 2C is a lateral cross-sectional view of a solid feed system, such as shown in FIG. 2A, depicting a relief area and a permeable barrier extending along a portion of a width of a flow path in an isolated injection section.

The solid feedstock will accelerate in the isolated injection section 46; however, the solid feedstock may not reach the velocity of the supersonic steam flow in the isolated injection section 46. The isolated injection section 46 may be oriented so that gravity may be utilized to accelerate solid feedstock particles and minimize the amount of momentum transfer from the supersonic steam flow to the solid feedstock. The velocity of the solid feedstock may be controlle by a distance from the injection port 52 in the wall of the isolated injection section 46 to the downstream supersonic diffuser 54, as this may affect the time that gravity accelerates the solid feedstock and/or the amount of time that shear forces may interact with the solid feedstock. Additionally, a velocity of the solid feedstock may be controlled by an exposed area for shear force interactions with the supersonic steam flow, which may be determined by the permeable barrier 60, as shown by dashed lines in FIGS. 2A and 3 that may be configured as one or more of a solid shield, a perforated shield, and a louvered shield, positioned between a solid feedstock flow path and the supersonic steam flow. In view of this, a maximum velocity of the solid feedstock may be selected to be at or near the minimum velocity required to move through a pressure rise in the supersonic diffuser 54, as the solid feedstock may decelerate as the pressure rises in the supersonic diffuser 54. Furthermore, the shape of the relief region 58 may affect the exposed area of the solid feedstock 12 for shear force interactions with the supersonic steam flow. For example, as shown in a cross-sectional view in FIG. 2B, the relief region 58 within the isolated injection section 46 may have the same width as a flow channel of the supersonic steam flow and the permeable barrier 60 may extend between opposing walls of the flow channel. In additional embodiments, such as shown in a cross-sectional view in FIG. 2C, a relief region 58' within an isolated injection section 46' may have a width that is less than a width of a flow channel of the supersonic steam flow and a permeable barrier 60' may extend across a width of the flow channel that is less than a total width of the flow channel of the supersonic steam flow. Additionally, the permeable barrier 60 may extend longitudinally from the injection port 52 to a location upstream from the supersonic diffuser 54, or may extend partially into the supersonic diffuser 54.

The supersonic diffuser 54 may be selected or designed for a specific supersonic steam flow Mach number through the isolated injection section 46. The supersonic diffuser 54 may decelerate the steam flow to subsonic speeds and increase the static pressure and temperature of the steam by converting fluid dynamic pressure of the supersonic flow stream to fluid static pressure. In view of this, the static pressure may be increased to an operating pressure of the reaction chamber 24 of the gasification system 10 (FIG. 1). For example, the steam may become pressurized by the supersonic diffuser 54 to a pressure near the pressure of the steam prior to being directed through the supersonic nozzle 44. The pressure of the steam exiting the supersonic diffuser 54 may be less than the pressure of the steam prior to being directed through the nozzle 44, such as due to total pressure losses in the supersonic diffuser 54, but the pressure loss may be minimized by a design of the supersonic diffuser 54.

Figure 4:
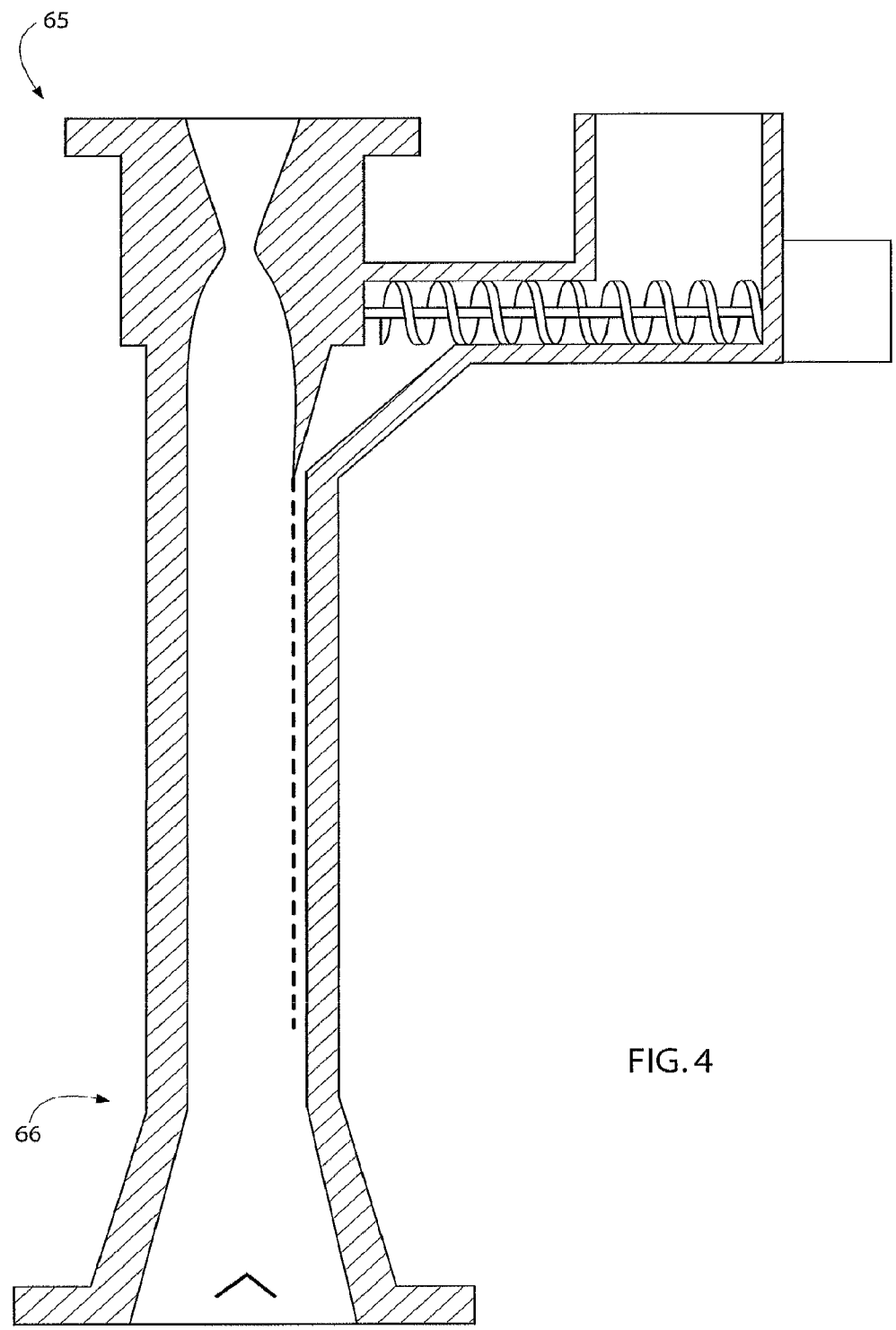
FIG. 4 is a longitudinal cross-sectional view of a solid feed system having a straight diffuser, according to another embodiment of the invention.

The supersonic diffuser 54 may be configured as a converging/diverging diffuser, such as shown in FIG. 2A. In additional embodiments, a solid feed system 65 may include a straight diffuser 66, such as shown in FIG. 4. A converging/diverging diffuser may be capable of achieving higher pressures and efficiencies, when compared to a straight diffuser, but a converging/diverging diffuser may include mechanical systems for system startup, such as a movable wall to provide a variable geometry, which may add complexity.

If a converging/diverging diffuser having a variable geometry is utilized, such as the supersonic diffuser 54 shown in FIG. 2A, any region of the supersonic diffuser 54 that may experience significant impingement of fluid flow, such as regions that protrude into the flow stream, may be positioned away from a region of the flow stream that may have the highest solid feedstock concentration. Positioning regions of the supersonic diffuser 54 that may experience significant impingement of fluid flow away from the flow of solid feedstock may avoid impingement of solid feedstock particles against the walls of the supersonic diffuser 54 and avoid erosion of the supersonic diffuser 54. Alternatively, positioning regions of the supersonic diffuser 54 that may experience significant impingement of fluid flow away from the flow of solid feedstock may at least reduce impingement of solid feedstock particles against the walls of the supersonic diffuser 54 and reduce erosion of the supersonic diffuser 54.

Figure 3:
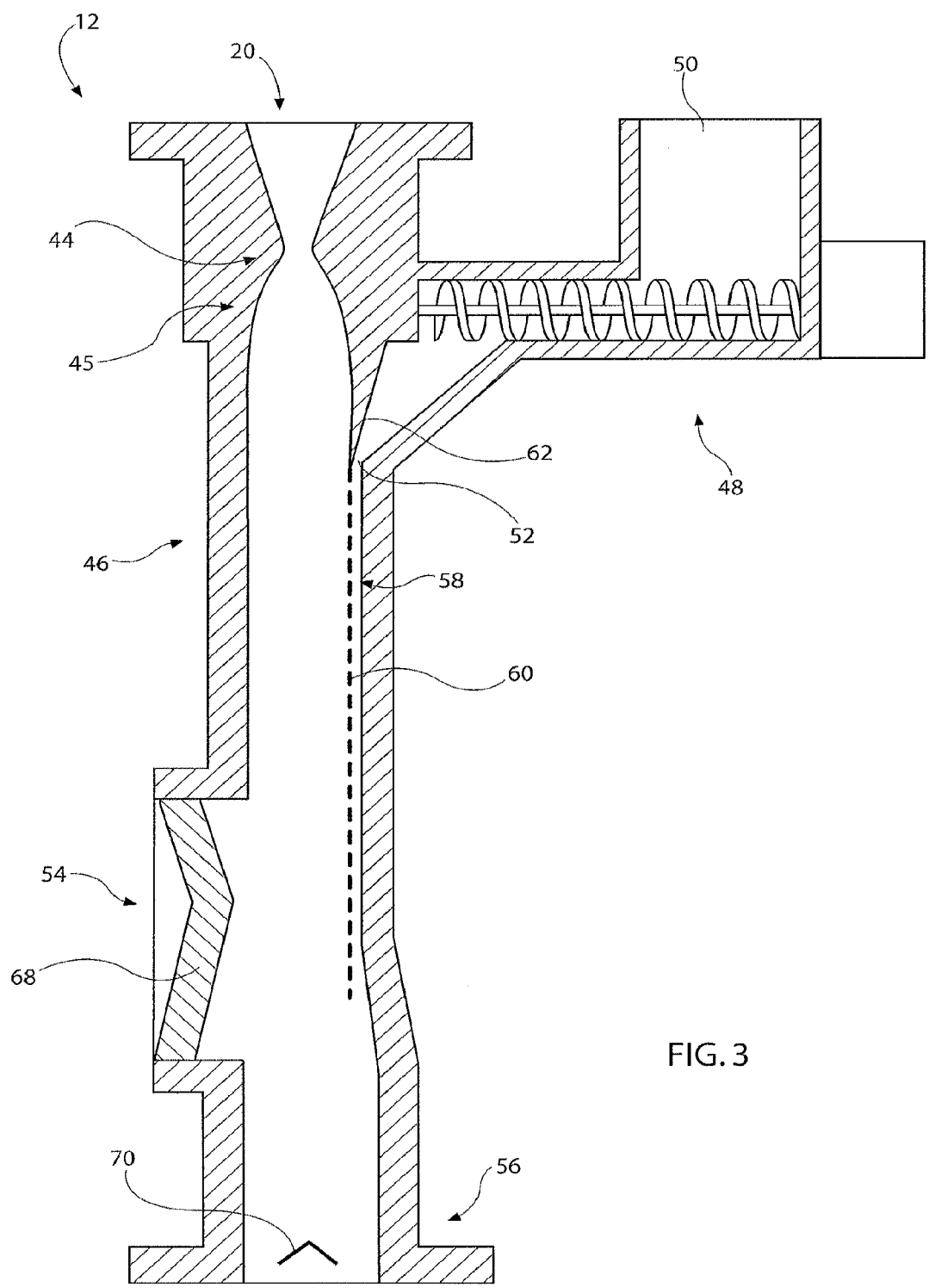
FIG. 3 is a longitudinal cross-sectional view of the solid feed system of FIG. 2A, having a movable wall of a supersonic diffuser in a startup position.

The supersonic diffuser 54 may include a cross-sectional shape that is generally rectangular (e.g., generally square), and may include a movable wall 68 to provide a variable geometry (i.e., a variable throat area) and to create a second throat, as shown in FIGS. 2A and 3. By providing a generally rectangular cross-section, the geometry of the movable wall 68 may be simplified. For example, the movable wall 68 may be positioned within a single wall of a four-walled region, and the sides of the movable wall 68 may abut and slide against substantially planar surfaces provided by adjacent walls.

Initially, the movable wall 68 may be positioned in a startup position, as shown in FIG. 3, which may provide a relatively open flow geometry to facilitate startup of the gasification system 10 (FIG. 1). Then, the movable wall 68 may be moved to an operating position, as shown in FIG. 2A that may provide optimal flow geometry in a steady-state operation that may facilitate efficient operation of the supersonic diffuser 54 and thereby achieve a relatively high pressure for the reaction chamber 24 (FIG. 1).

After compression and deceleration in the supersonic diffuser 54, mixing of the solid feedstock and the steam may be facilitated with a mixing device 70 positioned within the flow stream. For example, and not limitation, one or more of a swirler, a bluff body and a V-gutter may be utilized to facilitate mixing of the steam and the solid feedstock. Additionally, mixing may be facilitated by fluid injection into the flow stream. For example, and not limitation, one or more of a secondary steam stream and an oxygen stream may be injected into the flow stream to facilitate mixing of the steam and the solid feedstock.

Pressurized and superheated steam mixed with the solid feedstock may then be directed out of the feed system 12 and into the reaction chamber 24 of the gasification system 10, as shown in FIG. 1. As the steam and solid feedstock enters the reaction chamber 24, oxygen from the oxygen source 28 may be pressurized in the compressor 30 and directed through the injector 32 into the reaction chamber 24 to react with the solid feedstock. For example, oxygen may react with a portion of the solid feedstock in a combustion reaction to provide heat in the reaction chamber 24 for the gasification process. In additional embodiments, all of the required heat for gasification may be provided from other sources and oxygen may not be injected into the reaction chamber 24 for combustion.

Within the heated and pressurized environment of the reaction chamber 24 of the gasification system 10, the solid feedstock (i.e., organic material such as coal or biomass) may react with the oxygen and the steam to form syngas (i.e., a combination of hydrogen and carbon monoxide).

$$3C + O_2 + H_2O \rightarrow H_2 + 3CO$$

Optionally, additional water may be reacted with the carbon monoxide component of the syngas, in a water gas shift reaction, to produce additional hydrogen.

$$CO + H_2O \rightarrow CO_2 + H_2$$

Syngas and other reaction products, such as ash or slag, may then be directed out of the reaction chamber 24. Solids, such as ash or slag, may then be directed through the waste port 34 and the syngas may be directed through a separate conduit 72 to the three-way valve 36. From the three-way valve 36 the syngas may be divided into two separate streams. A first stream of syngas may exit the gasification system 10 through a product line 74 as a product stream. The product stream may be stored, or may be directed to a point of use, such as to a gas turbine to power an electric generator or to a chemical synthesis process. A second stream of syngas may be directed through a process line 76 and utilized to provide heat for the gasification process.

The second stream of syngas through process line 76 may be directed through the burner 38, where it may be combusted with air provided by the air blower 40. Heated combustion gases may then exit the burner 38 and be directed through the heat exchanger 18, wherein heat from the combustion gases may be used to heat the water for the gasification process. After passing through the heat exchanger 18, the combustion gases may be directed through the exhaust 42 and out of the gasification system 10.

Figure 5:
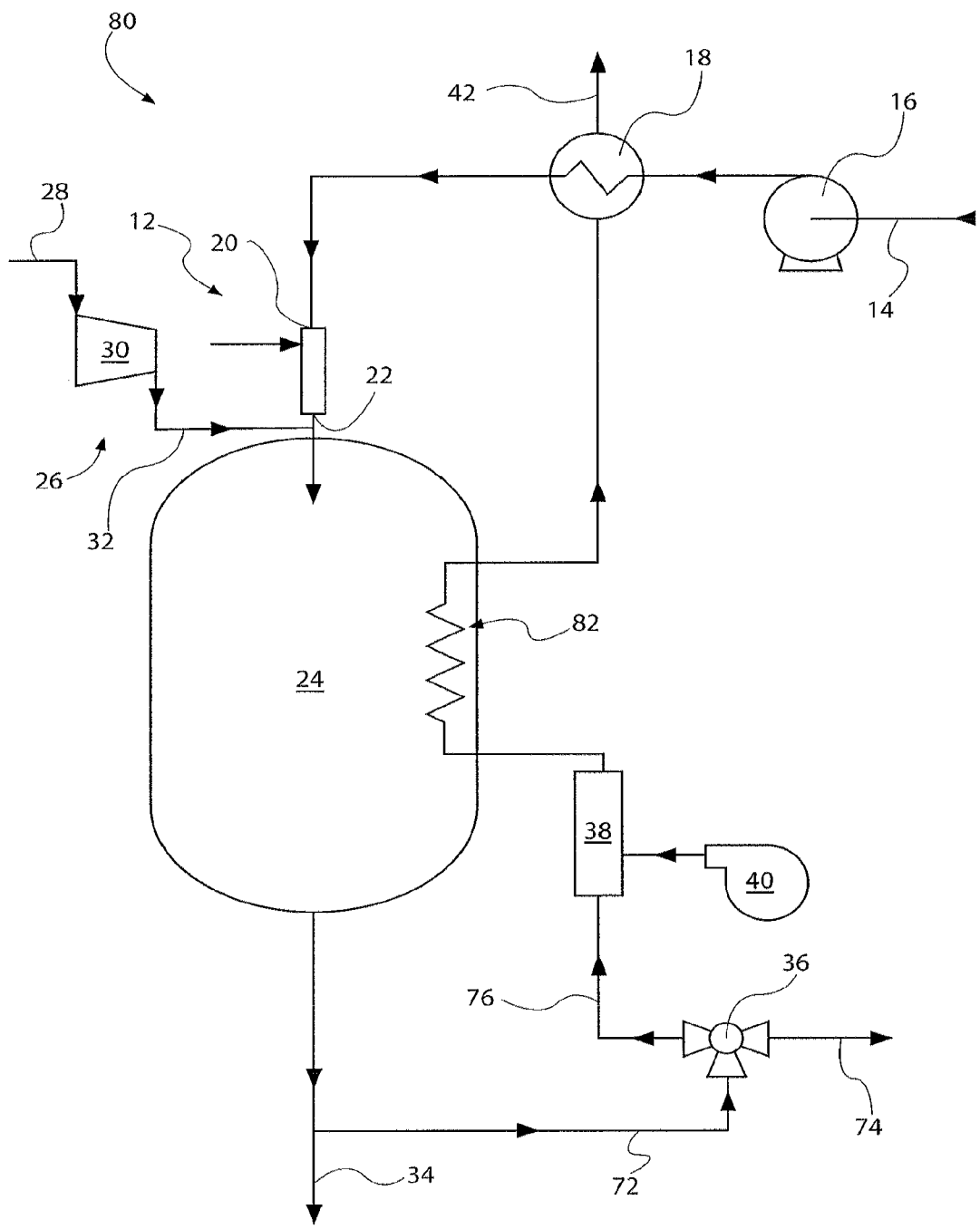
FIG. 5 is a schematic diagram of a gasification system including a solid feed system and further including indirect heating of a reaction chamber, according to another embodiment of the invention.

In additional embodiments, an indirect fire gasification system 80 may be utilized, such as shown in FIG. 5. The indirect fire gasification system 80 may be generally similar to the direct fire gasification system 10 shown in FIG. 1, with the addition of a heat exchanger 82 for providing additional heat to the reaction chamber 24.

The heat exchanger 82 may be positioned downstream of a burner 38 and upstream of the heat exchanger 18. In view of this, the heated combustion gases from the burner 38 may transfer heat first to the reaction chamber 24 by the heat exchanger 82 and then transfer heat to water in the heat exchanger 18.

Example Embodiments

In one embodiment, a gasifier may be sized and configured for 200 megawatts power production. Water may be directed into the system at a flow rate of about 4.4 kg/s and may be pressurized and heated to form superheated steam having a pressure of about 1,266 psia and a temperature of about 798° C. flowing through an inlet plenum. The supersonic nozzle may have a throat diameter of about 4.57 cm (about 1.8 inches).

The isolated injection section may be square and have a dimension of about 12.2 cm (about 4.8 inches) across and a cross-sectional area of about 146 cm² (about 22.7 in²). The steam may travel through the isolated injection section in a supersonic flow stream having a velocity corresponding to about Mach 3.5, a static pressure of about 14.7 psia, and a temperature of about 110° C. Solid feedstock in the form of coal particulate may be directed into the isolated injection section at a flow rate of about 19.25 kg/s by a screw feeder.

A mixture of steam and coal particulate may exit the supersonic diffuser through a rectangular injector section having a width of about 12.2 cm (about 4.8 inches) and a depth of about 12.7 cm (about 5 inches) into the gasifier. The steam and coal particulate may pass through the injector into the gasifier at a speed of about 11.2 m/s (about 37 ft/s) and at a pressure near the operating pressure of the gasifier of about 500 psia. The oxygen may be injected at a flow rate of about 16.6 kg/s into the gasifier, separate from the steam and coal particulate.

In another embodiment, a gasifier may be sized and configured for 200 megawatts power production. Water may be directed into the system at a flow rate of about 4.4 kg/s and may be pressurized and heated to form superheated steam having a pressure of about 1,936 psia and a temperature of about 618° C. flowing through the inlet plenum. The supersonic nozzle may have a throat diameter of about 3.56 cm (about 1.4 inches).

The isolated injection section may be square and have a dimension of about 7.1 cm (about 2.79 inches) across and a cross-sectional area of about 50 cm² (about 7.76 in²). The steam may travel through the isolated injection section in a supersonic flow stream having a velocity corresponding to about Mach 2.97, a static pressure of about 50 psia, and a temperature of about 110° C. Coal particulate may be directed into the isolated injection section at a flow rate of about 19.25 kg/s by a rotary airlock.

A mixture of steam and coal particulate may exit the supersonic diffuser through a rectangular injector section having a width of about 7.1 cm (about 2.79 inches) and a depth of about 12.7 cm (about 5 inches) into the gasifier. The steam and coal particulate may pass through the injector into the gasifier at a speed of about 8.7 m/s (about 29 ft/s) and at a pressure near the operating pressure of the gasifier of about 1,000 psia. Oxygen may be injected at a flow rate of about 16.6 kg/s into the gasifier, separate from the steam and coal particulate.

In yet another embodiment, a gasifier may be sized and configured for 20 megawatts power production. Water may be directed into the system at a flow rate of about 0.44 kg/s and may be pressurized and heated to form superheated steam having a pressure of about 277 psia and a temperature of about 469° C. flowing through the inlet plenum. The supersonic nozzle may have a throat diameter of about 1.65 cm (about 0.65 inch).

The isolated injection section may be square and have a dimension of about 2.54 cm (about 1.0 inch) across and a cross-sectional area of about 6.45 cm² (about 1.0 in²). The steam may travel through the isolated injection section in a supersonic flow stream having a velocity corresponding to about Mach 2.54, a static pressure of about 14.7 psia, and a temperature of about 110° C. Coal particulate may be directed into the isolated injection section at a flow rate of about 1.93 kg/s by a screw feeder.

A mixture of steam and coal particulate may exit the supersonic diffuser through a rectangular injector section having a width of about 2.54 cm (about 1.0 inch) and a depth of about 7.62 cm (about 3 inches) into the gasifier. The steam and coal particulate may pass through the injector into the gasifier at a speed of about 24.5 m/s (about 81 ft/s) and at a pressure near the operating pressure of the gasifier of about 1.03 MPa (about 150 psia). Additionally, the gasifier may be indirectly heated with combustion gases from a burner, without injection of oxygen into the gasifier.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention covers all modifications, equivalents, and alternatives falling within the scope of the invention as defined by the following appended claims and their legal equivalents. For example, elements and features disclosed in relation to one embodiment may be combined with elements and features disclosed in relation to other embodiments of the present invention.

What is claimed is:

1. A solid feed system, comprising:
a supersonic nozzle configured to form a supersonic steam flow;
a supersonic fluid flow path defined by the supersonic steam flow;
an isolated injection section positioned downstream from the supersonic nozzle, the isolated injection section having a port for injection of solid feedstock, the port positioned and oriented in a direction substantially aligned with the supersonic steam flow path;
a supersonic diffuser positioned downstream from the isolated injection section;
a solid feedstock flow path originating at the port and extending downstream at least partially through the isolated injection section in a direction substantially aligned with the supersonic fluid flow path; and
a barrier comprising a perforated shield positioned in the isolated injection section between the supersonic steam flow path and the solid feedstock flow path.

2. The solid feed system of claim 1, further comprising a screw feeder operably associated with the port of the isolated injection section.

3. The solid feed system of claim 1, further comprising a rotary airlock operably associated with the port of the isolated injection section.

4. The solid feed system of claim 1, wherein the supersonic diffuser comprises a straight diffuser.

5. The solid feed system of claim 1, wherein the supersonic diffuser comprises a converging/diverging diffuser.

6. The solid feed system of claim 5, wherein the supersonic diffuser further comprises a variable throat area.

7. The solid feed system of claim 1, wherein the supersonic nozzle further comprises a shape-change region, configured to implement a change in cross-sectional shape from generally round to generally rectangular.

8. The solid feed system of claim 1, further comprising a relief region located downstream of the port in the isolated injection section, the relief region sized to accommodate injection of solid feedstock within the isolated injection section without disruption of a supersonic flow within the isolated injection section.

9. The solid feed system of claim 8, wherein the relief region has a width the same as a width of a flow channel of the supersonic steam flow path.

10. The solid feed system of claim 8, wherein the relief region has a width that is less than a width of a flow channel of the supersonic steam flow path.

11. The solid feed system of claim 1, further comprising a mixing device located downstream of the supersonic diffuser.

12. The solid feed system of claim 11, wherein the mixing device comprises at least one of a swirler, a bluff body, and a V-gutter.

13. A gasification system, comprising:
a fluid inlet port;
a solid feed system, comprising:
a plenum operably associated with the fluid inlet port;
a supersonic nozzle downstream from the plenum, the supersonic nozzle configured to form a supersonic steam flow;
a supersonic fluid flow path defined by the supersonic steam flow;
an isolated injection section positioned downstream from the supersonic nozzle, the isolated injection section having a port positioned and oriented in a direction substantially aligned with the supersonic steam flow path;
a supersonic diffuser positioned downstream from the isolated injection section;
a solid feedstock flow path originating at the port and extending downstream at least partially through the isolated injection section in a direction substantially aligned with the supersonic fluid flow path; and
a barrier positioned in the isolated injection section between the supersonic fluid and the solid feedstock flow path; and
a reaction chamber downstream of the solid feed system.

14. The gasification system of claim 13, further comprising:
a water pump and a heat exchanger operably associated with the fluid inlet port;
a burner operably coupled to a gas outlet of the reaction chamber; and
a conduit configured to convey an exhaust of the burner to the heat exchanger.

15. The gasification system of claim 14, further comprising a conduit configured to convey an exhaust of the burner to a heat exchanger operably associated with the reaction chamber.

16. The gasification system of claim 13, wherein the barrier comprises at least one of a solid shield, a perforated shield, and a louvered shield.

17. The gasification system of claim 13, wherein the barrier extends longitudinally at least partially from the port of the isolated injection section to the supersonic diffuser.

18. A method of reacting a solid feedstock under pressure, the method comprising:
directing a fluid flow through a supersonic nozzle to provide a supersonic flow stream;
directing the supersonic flow stream through an isolated injection section positioned downstream from the supersonic nozzle at a static pressure at least fifty percent (50%) lower than an operating pressure within a reaction chamber;
feeding a solid feedstock from a substantially ambient pressure environment into the isolated injection section through a port of the isolated injection section, the port positioned and oriented in a direction substantially aligned with a supersonic steam flow of the supersonic flow stream, wherein a barrier comprising a perforated shield is positioned in the isolated injection section between the supersonic flow stream and a solid feedstock flow path originating at the port and extending downstream at least partially through the isolated injection section in a direction substantially aligned with the supersonic steam flow of the supersonic flow stream;
converting fluid dynamic pressure of the supersonic flow stream to fluid static pressure with a supersonic diffuser positioned downstream from the isolated injection section to provide a pressurized fluid flow; and directing the pressurized fluid flow and solid feedstock into the reaction chamber.

19. The method of claim 18, wherein directing the supersonic flow stream through the isolated injection section at a static pressure at least fifty percent (50%) lower than an operating pressure within the reaction chamber comprises directing the supersonic flow stream through the isolated injection section at a pressure within ten percent (10%) of local atmospheric pressure.

20. The method of claim 18, further comprising:
directing water through a pump to provide a pressurized liquid water;
directing the pressurized liquid water through a heat exchanger to form a superheated steam; and
wherein directing the fluid flow through the supersonic nozzle comprises directing the superheated steam through the supersonic nozzle.

21. The method of claim 20, further comprising:
directing a syngas out of the reaction chamber;
combusting a portion of the syngas to provide combustion gases; and
heating the pressurized liquid water in the heat exchanger with the combustion gases.

22. The method of claim 21, further comprising heating the reaction chamber with the combustion gases.

23. The method of claim 18, further comprising directing oxygen into the reaction chamber, separately from the pressurized fluid flow and the solid feedstock.

24. The method of claim 18, further comprising accelerating the solid feedstock within the isolated injection section with gravitational forces.

* * * * *